United States Patent
Bacon et al.

(10) Patent No.: US 7,624,137 B2
(45) Date of Patent: Nov. 24, 2009

(54) METHOD AND APPARATUS FOR SCHEDULING AND PERFORMING GARBAGE COLLECTION IN A REAL-TIME SYSTEM WITH GUARANTEED SPACE BOUNDS

(75) Inventors: David Francis Bacon, Sleepy Hollow, NY (US); Perry Cheng, New City, NY (US); Vadakkedathu Thomas Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 10/751,595

(22) Filed: Jan. 5, 2004

(65) Prior Publication Data

US 2005/0149585 A1 Jul. 7, 2005

(51) Int. Cl.
*G06F 17/30* (2006.01)
*G06F 12/02* (2006.01)

(52) U.S. Cl. ..................... 707/206; 711/170
(58) Field of Classification Search ............... None
See application file for complete search history.

(56) References Cited

U.S. PATENT DOCUMENTS

| | | | | |
|---|---|---|---|---|
| 5,560,003 | A * | 9/1996 | Nilsen et al. | 707/206 |
| 5,604,902 | A * | 2/1997 | Burkes et al. | 707/206 |
| 5,680,582 | A * | 10/1997 | Slayden | 711/171 |
| 5,687,368 | A * | 11/1997 | Nilsen | 707/103 R |
| 5,692,185 | A * | 11/1997 | Nilsen et al. | 707/104.1 |
| 5,761,536 | A * | 6/1998 | Franaszek | 710/68 |
| 5,857,210 | A * | 1/1999 | Tremblay et al. | 707/206 |
| 5,873,104 | A * | 2/1999 | Tremblay et al. | 707/206 |
| 5,873,105 | A * | 2/1999 | Tremblay et al. | 707/206 |
| 5,903,900 | A * | 5/1999 | Knippel et al. | 707/206 |
| 6,081,665 | A * | 6/2000 | Nilsen et al. | 717/116 |
| 6,131,150 | A * | 10/2000 | DeTreville | 711/173 |
| 6,289,360 | B1 * | 9/2001 | Kolodner et al. | 707/206 |
| 6,393,440 | B1 * | 5/2002 | Salant et al. | 707/206 |
| 6,421,689 | B1 * | 7/2002 | Benson et al. | 707/206 |
| 6,470,436 | B1 * | 10/2002 | Croft et al. | 711/206 |

(Continued)

OTHER PUBLICATIONS

Nilsen, K, Cost-Effective Hardware-Assisted Real-Time Garbage Collection, ACM PLDI Workshop on Language, Compiler, and Tool Support for Real-Time Systems, Jun. 1994.*

(Continued)

*Primary Examiner*—Neveen Abel Jalil
*Assistant Examiner*—Mark Andrew X Radtke
(74) *Attorney, Agent, or Firm*—Michael J. Buchenhorner; Vazken Alexanian

(57) ABSTRACT

A garbage collection system that needs to meet real-time requirements with guaranteed space bounds uses a mostly non-copying hybrid collector that performs defragmentation with limited copying of objects. The garbage collection and the real-time application are interleaved on a time-based schedule. An interval for the interleaving is selected based upon a garbage collector processing rate, a garbage generation rate and a memory allocation rate of the real-time application. An amount of memory for the real-time application and the garbage collection process is selected based upon the maximum excess memory requirement of the garbage collection process and the maximum memory requirement for the application. Defragmentation is only performed when an amount of available memory falls below a predetermined level.

21 Claims, 7 Drawing Sheets

U.S. PATENT DOCUMENTS

| | | | |
|---|---|---|---|
| 6,480,862 B1 * | 11/2002 | Gall | 707/3 |
| 6,526,421 B1 * | 2/2003 | Houldsworth | 707/206 |
| 6,542,978 B2 * | 4/2003 | Goldstein et al. | 711/170 |
| 6,721,865 B2 * | 4/2004 | Lewis | 711/170 |
| 6,799,191 B2 * | 9/2004 | Agesen et al. | 707/206 |
| 6,826,583 B1 * | 11/2004 | Flood et al. | 707/206 |
| 6,874,074 B1 * | 3/2005 | Burton et al. | 711/170 |
| 6,938,245 B1 * | 8/2005 | Spertus et al. | 717/127 |
| 6,978,448 B1 * | 12/2005 | Plummer et al. | 717/140 |
| 7,062,519 B2 * | 6/2006 | Garthwaite | 707/206 |
| 7,287,049 B1 * | 10/2007 | Printezis et al. | 707/206 |
| 2002/0029357 A1 * | 3/2002 | Charnell et al. | 714/9 |
| 2002/0032719 A1 * | 3/2002 | Thomas et al. | 709/107 |
| 2002/0042807 A1 * | 4/2002 | Thomas et al. | 709/1 |
| 2002/0147899 A1 * | 10/2002 | Lewis | 711/170 |
| 2004/0073764 A1 * | 4/2004 | Andreasson | 711/170 |
| 2004/0078381 A1 * | 4/2004 | Blandy et al. | 707/101 |
| 2005/0114413 A1 * | 5/2005 | Subramoney et al. | 707/206 |
| 2005/0268049 A1 * | 12/2005 | De Lange | 711/149 |

OTHER PUBLICATIONS

Robertz, S. G. and Henriksson, R. 2003. Time-triggered garbage collection: robust and adaptive real-time GC scheduling for embedded systems. SIGPLAN Not. 38, 7 (Jul. 2003), 93-102. DOI= http://doi.acm.org/10.1145/780731.780745.*

Boehm, H., Demers, A. J., and Shenker, S. 1991. Mostly parallel garbage collection. In Proceedings of the ACM SIGPLAN 1991 Conference on Programming Language Design and Implementation (Toronto, Ontario, Canada, Jun. 24-28, 1991). PLDI '91. ACM, New York, NY, 157-164. DOI= http://doi.acm.org/10.1145/113445.113459.*

Wilson, P.R. 1992. Uniprocessor Garbage Collection Techniques. Available online at http://www.springerlink.com/content/m36636405668rnp8/.*

Nettles, S. and O'Toole, J. 1993. Real-time replication garbage collection. SIGPLAN Not. 28, 6 (Jun. 1993), 217-226. DOI= http://doi.acm.org/10.1145/173262.155111.*

* cited by examiner

METHOD AND APPARATUS FOR SCHEDULING AND PERFORMING GARBAGE COLLECTION IN A REAL-TIME SYSTEM WITH GUARANTEED SPACE BOUNDS

CROSS-REFERENCE TO RELATED APPLICATIONS

YOR92003177US1; YOR92003178US1; YOR92003179US1; YOR92003180US1; and YOR92003182US1.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed herein broadly relates to the field of computer memory management. More particularly, the present invention relates to a method and apparatus for implementing a garbage collection process in a real time system with guaranteed space bounds.

BACKGROUND OF THE INVENTION

With regard to computers, garbage collection refers to a process of identifying unused areas of main memory storage. In accordance with an object oriented computing language such as Java, the computer executing the program allocates memory for each of the objects. A Java Virtual Machine (JVM) using Java allocates memory for the instantiation of the objects from a free memory area called a heap. Memory is allocated to, and freed from, the heap in blocks of one of a number of predetermined sizes. Eventually, when the objects are no longer being referenced by the program, the memory allocated for the created objects is reclaimed through a garbage collection process. The garbage collection process clears the objects from memory whereby the once allocated memory is again available for use. More particularly, a garbage collection process involves automatically determining which blocks of memory can be freed, marking unused blocks as no longer needed by an application, collecting all of the unused blocks of memory at periodic intervals, returning the unused blocks to the heap and marking the blocks as free for use. Such a garbage collection process is often referred to as a mark-and-sweep since unused portions of memory are marked as garbage during a mark phase and then removed from allocated memory in a sweep phase. Although the process of garbage collection frees memory it may be problematic in applications where its unpredictable consumption of processor time affects the running of the application.

The exact garbage collection strategy used by an object oriented program will often vary depending on the type of system in which the program is executing. For example, in some implementations, the garbage collector is a built-in component. In other applications, different garbage collectors may be plugged in for different circumstances. Many different algorithms have been employed in these different garbage collector implementations. For example, server applications in a multi-user multiprocessor environment tend to have a memory-use profile that differs from a uni-processor desktop computer environment. Furthermore, embedded-Java devices such as cell phones and handheld devices have different memory-use profiles. A single garbage collector is typically designed to implement one particular strategy and cannot be modified "on-the-fly" to change its strategy. Therefore, a customized garbage collector must typically be built into each programming instance depending upon the computer platform and operating environment in which the program is executing. On any given day, a particular set of garbage collection characteristics or garbage collection algorithm metrics will be better for one device but not for another device. For example, a device with a small amount of memory may require a very aggressive garbage collection routine whereas as a large server with lots of memory may permit a more relaxed approach. In each case, a different type of garbage collection algorithm is needed in order to adapt the performance of the garbage collector to the performance characteristics of the hardware platform. Therefore, what is needed is a garbage collection process having guaranteed space bounds that can be easily be tuned for a variety of particular applications.

SUMMARY OF THE INVENTION

An application of the present invention is directed toward a method of scheduling a garbage collection process for a real-time application such that it has determinable space bounds. In accordance with the method, a mostly non-copying hybrid collector is used that performs defragmentation with limited copying of objects. The garbage collection and the real-time application are interleaved on a time-based schedule. An interval for the interleaving is selected based upon a garbage collector processing rate, a garbage generation rate and a memory allocation rate of the real-time application. A maximum excess memory requirement for the garbage collection and a maximum memory requirement for the application are determined and the amount of memory for the real-time application and the garbage collection process is selected based upon the combined requirements. Defragmentation is preferably only performed when an amount of available memory falls below a predetermined level.

Another application of the present invention is directed toward a computer-readable medium that includes a program product for implementing a garbage collection process for a real-time application such that the real-time application can meet its real-time requirements. The computer-readable medium includes instructions for reducing a memory overhead and time requirement for the garbage collection process by using a limited copying collector such that the to-space and the from-space have a large intersection. The computer-readable medium also includes instructions for only performing defragmentation as part of the garbage collection process when an amount of free memory falls below a predetermined threshold level. The application and the garbage collection process are interleaved on a work-based schedule or time-based schedule. For a work-based embodiment, a memory requirement for the application and the garbage collection process is determined based upon an allocation quantum of the application and an allocation quantum of the garbage collection process. For a time-based embodiment, a time interval for the garbage collection process is selected based upon a garbage generation rate and a time interval for the real-time application is selected based upon a memory allocation rate of the real-time application. An amount of memory for implementing the garbage collection process and the real-time application is selected based upon a maximum excess memory requirement of the garbage collection process and a maximum memory requirement of the real-time application. The application includes a mutator and the mutator's write barrier is responsible for making sure that only non-null, unmarked objects are placed into a write buffer.

Yet another application of the present invention is directed toward a computer apparatus for performing a real-time application. The computer apparatus includes application software for performing the real-time application and garbage collection software for implementing a garbage collection process wherein only a portion of objects in a heap are moved as part of the garbage collection process. A processor having a memory runs the application software and the garbage collection software. The size of the memory is selected based upon a maximum excess memory requirement of the garbage collection process and a maximum memory requirement of the real-time application. Time-scheduling software interleaves the garbage collection process and the real-time application on a time-based schedule. An interval for the garbage collection process is selected based upon a garbage generation rate and a garbage collector processing rate. An interval for the real-time application is selected based upon a memory allocation rate of the real-time application.

Yet another application of the present invention is directed to a method of performing a garbage collection process for an application. According to the method, an amount of memory required to run the garbage collection process is determined. The method then waits until the determined amount of memory is available for the garbage collection process. When the memory is available, the garbage collection process is performed. The garbage collection process and the application are interleaved on a work-based schedule such that the application performs a mutator quantum of allocation and the garbage collector performs a collector quantum of collection during a cycle of the work-based schedule. The amount of memory required to run the garbage collection process is calculated as an amount of live memory used by the application multiplied by a ratio of the mutator quantum to the collector quantum. Alternatively, the amount of memory required to run the garbage collection process may be calculated as a maximum live memory requirement of the application over an execution interval multiplied by a ratio of the mutator quantum to the collector quantum.

DETAILED DESCRIPTION

A collector constructed in accordance with a preferred embodiment of the present invention will provide guaranteed performance provided that the application is correctly characterized by the user. In particular, the user must be able to specify the maximum amount of simultaneous live data, m, as well as the peak allocation rate over the time interval of a garbage collection $\alpha^*(\Delta GC)$. The collector is parameterized by its tracing rate R. Given these characteristics of the mutator and the collector, the user has the ability to tune the performance of the system using three interrelated parameters: total memory consumption, minimum guaranteed CPU utilization and the resolution at which the utilization is calculated.

Figure 1:
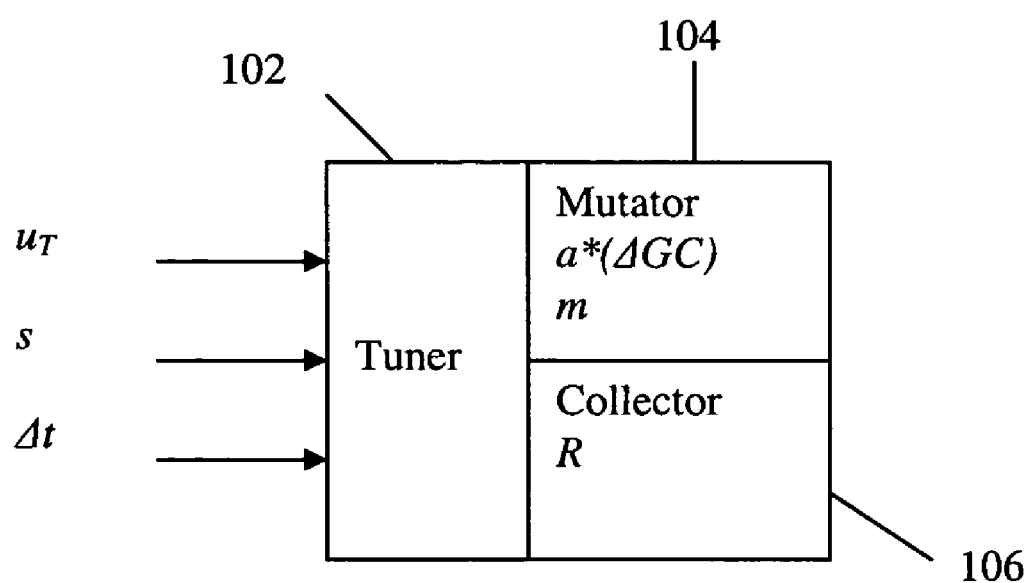
FIG. 1 is a diagram of the system parameters that can be used to tune the performance of an object oriented application in accordance with an embodiment of the present invention.

The relationship between these parameters is shown graphically in FIG. 1. The mutator 104 is characterized by its allocation rate over a garbage collection interval $\alpha^*(\Delta GC)$ and by its maximum memory requirement m. The collector 106 is characterized by its collection rate R. The tunable parameters 102 are $\Delta t$, the frequency at which the collector is scheduled, and either the CPU utilization level of the application $u_T$ (in which case a memory size s is determined) or a memory size s which determines the utilization level $u_T$. By setting these parameters to limit CPU utilization and memory size, and using defragmentation techniques, a garbage collection routine can be implemented in a real-time application such as an automotive control system that has strict availability requirements.

Figure 2:
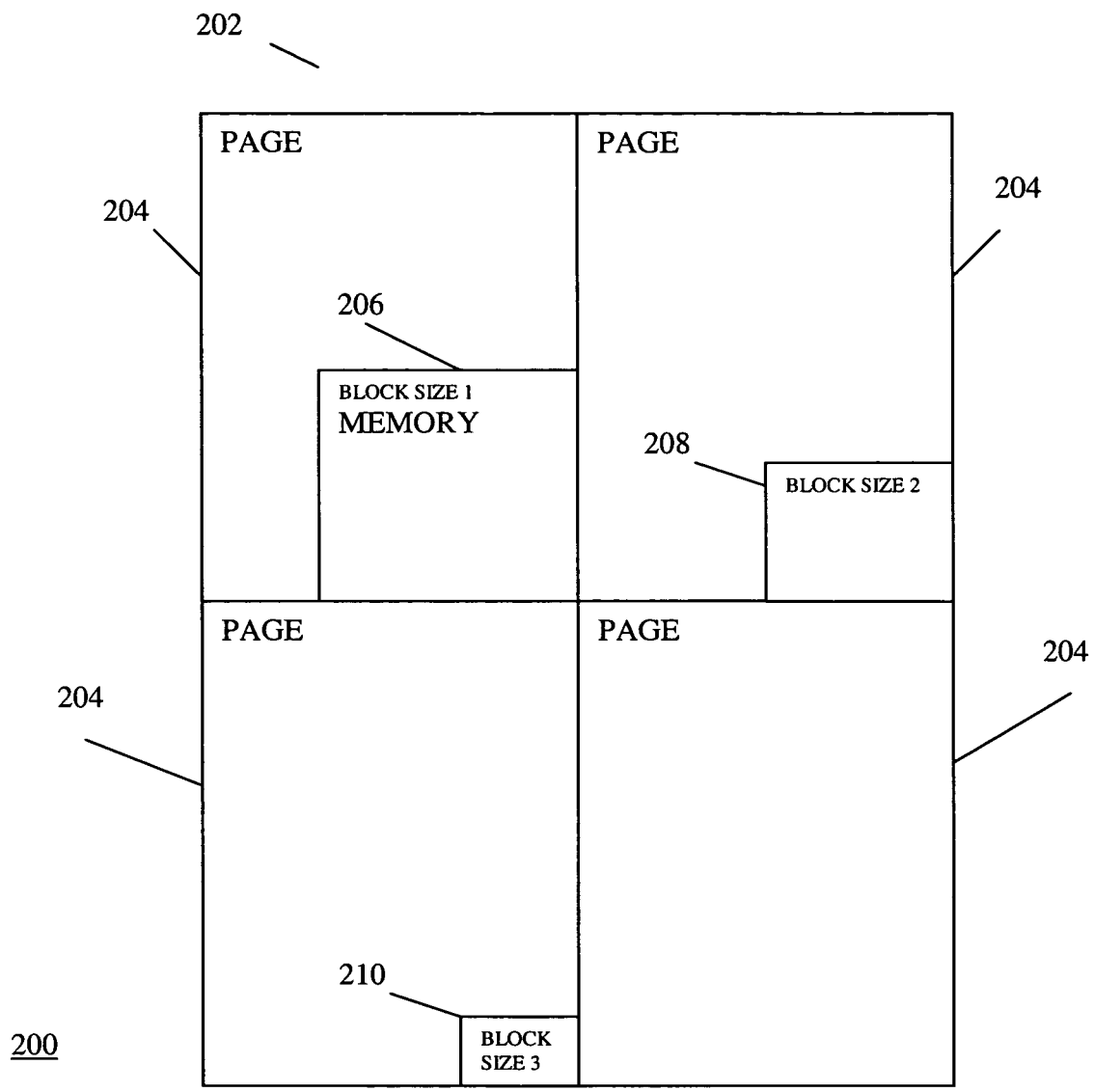
FIG. 2 is a diagram of a method of dividing a memory into pages and block class sizes in accordance with an embodiment of the present invention.

Referring now to FIG. 2, a diagram 200 of a scheme 200 for dividing a memory 202 according to a preferred embodiment of the present invention is shown. The memory 202 is divided into a series of pages 204 each of a size Π. Each page 204 is divided into a number of fixed size blocks 206, 208 and 210 with a maximum block size 206 of Σ. In a preferred embodiment, the page size, Π, and the maximum block size, Σ, are both powers of two. While the maximum block size is Σ, a number, n, of smaller classes of block sizes are also created. Memory is allocated for objects from blocks of the smallest size class that will accommodate the object. Using a large number of block size classes with a relatively low ratio of adjacent class sizes reduces the amount of fragmentation as discussed in more detail below.

The total fragmentation of a system such as that shown in FIG. 2 can be categorized as one of three types. First, there is unused space at the end of each block which is referred to as internal fragmentation. Internal fragmentation is fundamentally expressed as a ratio between the inherent space required by live objects and the actual amount of space they consume. A ratio ρ between the adjacent block sizes shown in FIG. 2 can be used to bound the amount of internal fragmentation. In particular, a preferred embodiment of the present invention uses a small ratio between adjacent block size classes because, even if fragmentation occurs, the blocks will be compacted and unused pages can be redistributed to other sizes. Thus, the internal fragmentation is limited to ρ by selecting the block size classes such that adjacent size classes $c_i$ and $c_{(i-1)}$ satisfy the formula $c_i = c_{(i-1)}(1+\rho)$. The collector is, thus, adaptive in that it responds to the changing object size needs of an application. However, it will be appreciated that when the system is operating in the steady state, the distribution of object sizes is relatively constant and little defragmentation may actually be required.

Secondly, there is unused space at the end of a page which is referred to as page-internal fragmentation. The ratio of the page size to the largest block class size primarily determines the amount of page-internal fragmentation. More particularly, the amount of internal fragmentation is generally bound by the largest block size divided by the page size. Thus, the selection of the page size and the largest block size class may be used to bound the page-internal fragmentation for time or memory sensitive applications.

Finally, there are unused blocks that could satisfy a request for a different size object. This type of fragmentation is referred to as external fragmentation. External fragmentation only occurs on pages that have both live and dead objects. External fragmentation is often determined by the size of the objects being allocated by the application. Applications typically exhibit locality in that the number of objects of a particular size class that were allocated during a previous cycle is often a good predictor of the number of objects in the size class that will be allocated during the next cycle. External fragmentation is practically eliminated in accordance with an embodiment of the present invention by using arraylets or blocks whereby large arrays are broken into fixed-sized pieces. This bounds the potential external fragmentation caused by large objects. In addition, explicit defragmentation may be performed on pages containing dead objects as discussed in more detail herein.

A read barrier is preferably used to address the pages and blocks of the memory. A most preferred embodiment of the present invention uses a Brooks-style read barrier wherein each object contains a forwarding pointer that normally points to itself. However, when the object has been moved, the pointer points to the moved object. The memory is divided into a current area referred to as the from-space that is used by the processors during current program execution and a reserved area referred to as the to-space. Because the preferred embodiment uses a forwarding pointer, the collector maintains a to-space invariant. Thus, the mutator or application always sees the new version of an object. However, the sets comprising the from-space and to-space have a large intersection, rather than being completely disjoint as in a pure copying collector. While the preferred embodiment uses a read barrier and a to-space invariant, the collector does not suffer from variations in mutator utilization because all of the work of finding and moving objects is performed by the collector during the collection phase.

The read barrier can be either lazy or eager. A lazy barrier has the property that registers and stacks cells can point to either from-space or to-space objects and the forwarding operation is performed at the time of use. Conversely, an eager barrier maintains the invariant such that registers and stack cells always point into to-space. Thus, the forwarding operation is performed eagerly as soon as the quantity is loaded. Eager barriers have a major performance advantage in that if a quantity is loaded and then dereferenced many times, such as when a reference to an array of integers is loaded and then used in a loop, the eager barrier will only perform the forwarding operation once. A lazy barrier will perform the forwarding operation for every array access. The cost to using an eager barrier is that because the eager barrier is stricter it is more complex to maintain. Whenever the collector moves objects, it must find all outstanding register and stack cells and re-execute the forwarding operation on them.

Figure 3:
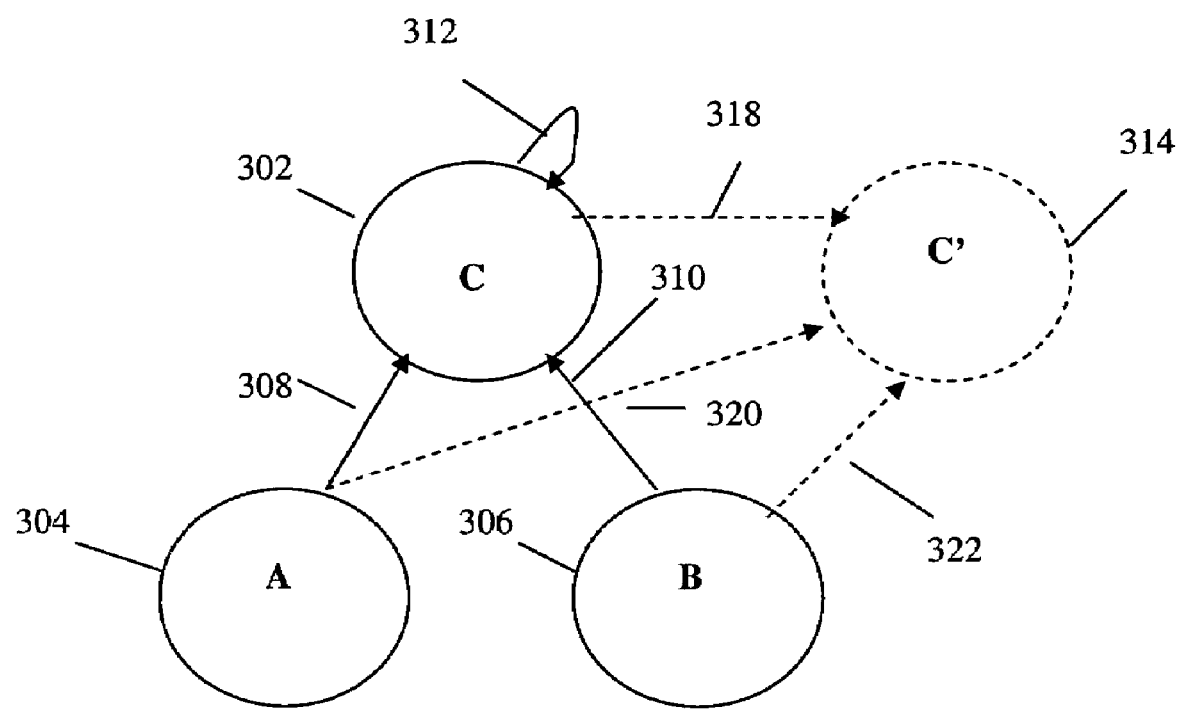
FIG. 3, is an illustration of a method of moving objects using a read barrier with a forwarding pointer in accordance with an embodiment of the present invention.

A preferred method 300 of moving of an object using a read barrier with a forwarding pointer in accordance with an embodiment of the present invention is described with respect to FIG. 3. The object to be moved C 302 is referenced by two applications A 304 and B 306 which have their respective pointers 308 and 310 pointing toward C 302. The forwarding pointer 312 in C 302 originally points to C 302 itself. To move the object C 302, a new block of memory C' 314 is first allocated for the object C 302. Once a new block of memory has been allocated, the content of C 302 is then moved into C' 314. The forwarding pointer 312 of object C 302 is then pointed 318 toward C' 314. Thus, if an application calls on object C 302, the forwarding pointer 318 redirects the application to C' 314. Finally, the pointers 308 and 310 from applications A 304 and B 306 are redirected, as shown by arrows 320 and 322 respectively, toward the new memory location for the object C' 314. Thus, the collector maintains a to-space invariant such that the mutator or application always sees the new version C' of the object C. Once the pointers 308 and 310 have been updated to pointers 320 and 322 to point to C' 314, the object C 302 is no longer referenced by an application. Thus, the object C 302 will be marked as unused or dead during the mark phase such that the memory blocks will be freed for future use as discussed in more detail below.

Figure 4:
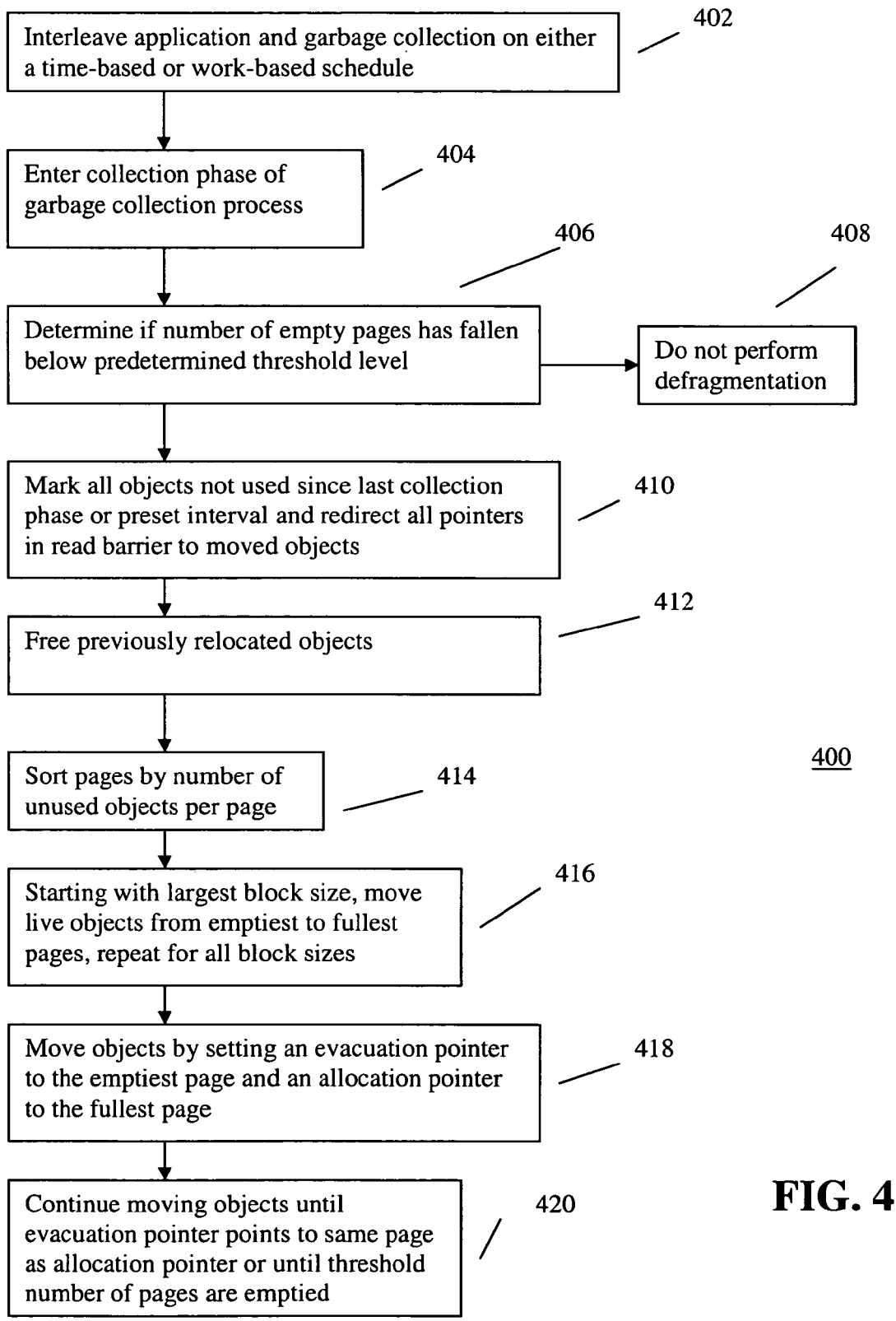
FIG. 4 is a flow chart for implementing a defragmentation process during a garbage collection phase in accordance with an embodiment of the present invention.

Referring now to FIG. 4 a preferred method 400 for accomplishing defragmentation during the collection phase of a garbage collection process is shown. In step 402, the application and garbage collection are interleaved on either a time-based or work-based schedule. Work-based algorithms may achieve short individual pause times but are typically unable to achieve consistent utilization. A work-based algorithm does a little garbage collection each time the mutator allocates memory. By keeping this interruption short, the work of collection is spread evenly throughout the application. Unfortunately, programs are not uniform in their allocation behavior over short time scales, rather they are bursty. As a result, work-based strategies suffer from very poor mutator utilization during such bursts of allocation. Time-based scheduling interleaves the collector and the mutator on a fixed schedule. These systems are quite stable and only require a small number of coarse parameters that describe the application's memory characteristics to function within well controlled space bounds.

Defragmentation occurs during the garbage collection phase as set forth in step 404. First, it is determined whether or not the number of empty pages of memory has fallen below a threshold number of empty pages of memory as shown in step 406. If the threshold has not been breached, the proceeds to step 408 wherein no defragmentation occurs during the present garbage collection phase. The threshold number of pages is selected such that there is always enough memory to run the primary real time application. If the threshold has been breached, the method proceeds to step 410 wherein all objects that have not be used since the last collection cycle are marked as dead objects. During the mark phase of the garbage collection process, the memory blocks for all of the objects that have been previously relocated during a previous collection process are freed or released for future use as shown in step 412.

Once the objects have been marked as used or unused, the pages of memory are sorted according to the number of dead objects per page as shown in step 414. In one embodiment, the first entry in the list contains the page with the least number of dead or dead objects and the last entry contains the page with the greatest number of dead objects. In step 416, starting with the largest block size, live objects are moved from the pages having the most dead objects to pages having the least dead objects. After the largest block class sized objects have been moved, the process is repeated for each lower block size. The later smaller classes of blocks are used to fill in the holes left by the allocation of the larger earlier blocks. Thus, proceeding in this manner reduces the internal fragmentation of the heap. The objects are preferably moved by setting an evacuation pointer to the emptiest page and an allocation pointer to the fullest page in step 418. The process continues in step 420 until the evacuation pointer and the allocation pointer point to the same page or, alternatively, until the threshold number of pages has been emptied. The process then waits until the threshold is again violated at which time the garbage collection cycle begins again.

Preferred embodiments of the present invention are particularly well suited for use with applications that require real-time scheduling. The combined real-time behavior of the user program and the garbage collector is defined using the instantaneous memory allocation rate at time $\tau$, $A^*(\tau)$, and the instantaneous garbage generation rate at time $\tau$, $G^*(\tau)$. A unit for these quantities would be megabytes per second or MB/s. The amount of memory allocated and garbage generated over an interval is obtained by integrating $A^*(\tau)$ and $G^*(\tau)$ over the interval. P is used to define the garbage collector processing rate. Since the preferred collector is a tracing collector, P is measured over live data. The time $\tau$ is on an idealized axis in which the collector runs infinitely fast called mutator time. As a practical matter, this can be thought of as time measured when the program has sufficient memory to run without garbage collecting. The only other primitive parameters required to describe the real-time system are the relative rates of the mutator and the collector. These parameters are used to calculate a maximum memory allocation rate and maximum garbage generation rate. The instant memory requirement of the program excluding garbage, overhead and fragmentation is equal to the maximum memory allocation rate and the maximum garbage generation rate.

Because the collector is not infinitely fast, execution will consist of alternate executions of mutator and collector. For exemplary purposes, time along the real time axis may be denoted by the variable t. The function $\Phi(t) \to \tau$ then maps from real time t to mutator time $\tau$. Functions that operate in mutator time are written $f^*(\tau)$ while functions that operate in mutator time are written $f(\tau)$. The live memory of the program at time t can thus be defined as $m(t) = m^*(\Phi(t))$. The maximum memory requirement over the program's entire execution is simply the maximum value m of m(t).

As previously discussed, time-based scheduling interleaves the collector and mutator using fixed time quanta. Thus, time-based scheduling results in even CPU utilization but is subject to variations in memory requirements if the memory allocation rate is uneven. A time-based real-time collector has two additional parameters; $Q_T$, the mutator quantum or the amount of time the mutator is allowed to run before the collector is allowed to allocate; and, $C_T$, the time-based collector quantum or the amount of time the collector is allowed to run. If the scheduler is perfect and the number of time intervals is large, the minimum mutator utilization, $u_T$, may be expressed as $Q_T/(Q_T+C_T)$. However, it is important to note that in real-time systems the variations that occur over small intervals are very significant. In practice, at large time intervals $u_T$ is only a lower bound on the utilization, since in most cases the collector only runs intermittently.

In a real-time system, the space utilization of a time-scheduled collector is also important. If the collection rate is constant, at time t, the collector will run for m(t)/P seconds to process m(t) live data. Since the preferred collector is trace-based, work is essentially proportional to live data and not garbage. For a given period of time, the mutator will work for $Q_T$ seconds per $C_T$ seconds executed by the collector. Therefore, we can define the excess space required in order to run a collection at time, t, as $e_T(t) = \alpha^*(\Phi(t), \Phi(t)+(m(t)/P)(Q_T/C_T))$. The maximum excess space required is simply the maximum value of $e_T(t)$ over a period a time.

Freeing an object with a collector may require as many as three collections. The first is to collect the object. The second arises from the fact that an object may have become garbage immediately after a collection began and, therefore, will not be discovered until the following collection cycle. The third arises from the fact that an object may need to be relocated so that the system can make use of its space. The first two properties are universal for all garbage collection systems while the third results from the particular preferred system.

Given the above discussed parameters, the space requirements for a preferred collector paired with a given application including un-reclaimed garbage, but not including internal fragmentation, at time t can be expressed as $s_T(t) \leq m(t)+3e_T$. The maximum overall space requirement can be expressed as $s_T \leq m+3e_T$ using the above discussed parameters. However, the expected space utilization is only $m+e_T$ and the worst-case utilization is highly likely.

Work-based scheduling interleaves the collector with the mutator based on fixed amounts of allocation and collection. A work-based, real-time collector is parameterized by the work-based mutator quantum, $Q_W$, which is the number of bytes the mutator is allowed to allocate before the collector is allowed to run. The work-based collector is also parameterized by the work-based collector quantum, $C_W$, which is the number of bytes that the collector must process each time the mutator yields to it. The excess space required to perform a collection at time, t, is $e_W(t) = m(t)(Q_W/C_W)$. The excess space required for a collection over the entire execution is $e_W = m(Q_W/C_W)$. From this equation, it is apparent $Q_W$ must be less than $C_W$ or else the space might grow without bound. Thus, the space requirement of the program at time t is $s_W(t) \leq m(t)+3e_w$ and the space requirement for the entire program execution is $s_W = m+3e_W$.

Computing mutator CPU utilization when collector scheduling is work-based is inherently problematic because the operation of the mutator may affect the amount of time allocated to the mutator. The time dilation is linear and fixed in time-based scheduling but variable, non-linear and application-dependent in work-based scheduling. Due to these problems, it is not possible to obtain a closed-form solution for the utilization. However, each mutator pause involves the collector processing $C_W$ memory at rate P. Hence, each mutator pause will be of duration d where $d = C_W/P$. Each mutator quantum will involve application of $Q_W$ memory. Thus, the minimum total mutator time $\Delta\tau_i$ for i quanta will be given by the minimum $\Delta\tau_i$ that satisfies the equation $\alpha^*(\Delta\tau_i) = iQ_W$. As the time interval increases, the maximum allocation in that time does not decrease, so $\alpha^*(\Delta\tau_i)$ is a monotonically increasing function and hence $\Delta\tau_i > \Delta\tau_{i-1}$. Therefore, the solution to the equation $\alpha^*(\Delta\tau_i) = iQ_W$ can be found with an iterative method. This is analogous to the iterative solution to rate monotonic scheduling in real-time systems. In a work-based collector, utilization will be zero for any interval of time less than the mutator pause. In fact, any large allocation of $nQ_W$ bytes will lead to zero utilization for time nd. Thus, in a work-based collector, there is a much larger burden on the programmer to achieve real-time bounds by making sure that memory allocation is sufficiently discretized and evenly spaced.

In addition to allocation, the other kind of work by the mutator that can interact with the operation of the collector is the actual heap mutation. Mutation is an alternate way for roots to be added long with stack scanning. Work is preferably divided between the mutator and the collector such that the mutator's write barrier is responsible for making sure that only non-null, unmarked objects are placed into the write buffer. This ensures that the work performed by the collector attributable to mutation is O(N) where N is the number of objects while the overhead of the write barrier is kept constant. The collector periodically processes the write buffer and treats the entries like any other potential roots. The objects are marked and placed in the work queue for scanning. In the worst case, the work queue can reach size N. Since mutation consumes memory just like allocation by the mutator, mutation should be taken into account when determining collector performance. This is accomplished by simply defining allocated memory to include both directly allocated memory and indirectly allocated memory due to mutation wherein each mutation consumes memory the size of one object pointer. However, if desired, the formulas discussed herein could be revised to express each kind of space consumption individually.

The degree to which each collector will be able to meet its predicted behavior will depend quite strongly on the accuracy of the parameters which are used to describe the application and the collector strategy. The needed parameters are $A^*(t)$ and $G^*(t)$ for the application, P for the collector and, either $Q_T$ and $C_T$ or $Q_W$ and $C_W$ depending upon whether the collector is time-based or work-based. In practice, the user describes the application in terms of its maximum memory consumption m and its maximum allocation rate $\alpha^*(\Delta\tau)$.

The CPU utilization rate UT of the time-based collector is strictly dependent on the quantization parameters $Q_T$ and $C_T$. Thus, the utilization is very steady depending only upon implementation induced jitter and subject to the minimum quantization that the implementation can support. On the other hand, the space required to perform a collection, which determines the total space required to run the application, is dependent on both the maximum memory usage by the application m and the amount of memory allocated over an interval $\alpha^*$. Thus, if the user underestimates either m or $\alpha^*$, the total space requirement may grow arbitrarily. In particular, time-based collectors are subject to such behavior when there are intervals of time in which the allocation rate is very high. Furthermore, the estimate of the collector processing rate P should be a lower bound on the actual rate. Since the space consumed by the application is over a relatively long interval of time, i.e., the amount of time the application runs while a single collection takes place, the allocation rate will typically be close to the average allocation rate of the program and the variation will tend to be low. Therefore, to a first order, a time-scheduled collector will meet both its time and space bounds as long as the user estimate of m is correct.

In the work-based collector, the space overhead for a collection is straightforward to compute and it will be accurate as long as the user estimate of the total live memory m is accurate. On the other hand, the CPU utilization rate for a given interval depends on the allocation rate $\alpha^*(\Delta\tau)$ as well as the collector processing rate P. Since the interval over which real-time performance is required is small, the peak allocation rate for this interval is likely to be quite high. Thus, the CPU utilization of the work-based collector will vary considerably with the allocation rate. In particular, it should be noted that the interval in which the time-based collector is dependent on allocation rate is on the same scale as the amount of time required for a garbage collection. Therefore, to a first order, a work-scheduled collector will meet its space bound as long as a user estimate of m is correct. However, its CPU utilization will be heavily dependent on the allocation rate over a real-time interval.

A robust real-time collector should primarily use a time-based scheduling policy. However, if memory resources become scarce due to the fact that the input parameters to the collector may have been incorrect, the collector can slow down the allocation rate. This can be done in a number of ways. One approach in a real-time system is to separate the threads into priority classes. If the system becomes unable to meet its real-time bounds, low-priority threads may be successively suspended. Another approach is to begin using a hybrid strategy which becomes progressively more work-based as the collector comes closer to its memory limit. This approach will not guarantee that real-time bounds are met. However, it is robust even if the allocation rate and memory utilization of the top-priority threads have been underestimated.

Since purely non-copying algorithms are subject to high and often unbounded fragmentation, they are typically not suitable for real-time systems. Incremental semi-space copying collectors have an inherent space over head of $2(m+e)+f+g$, where m is the maximum live heap memory, e is the space required to allow allocation to proceed during a single garbage collection, f is the maximum stack depth, and g is the maximum size of the global variable area. The preferred collector has an expected-case space requirement of $m+e+f+g$ and a worst-case cost of $m+3e+f+g+N$, where N is the maximum number of uncollected objects. The extra $2e+N$ of space is incurred when a data structure of a size close to m is freed immediately after the beginning of a collection. Thus, the collector must run again to find it. This requires e extra space. In addition, all garbage found causes external fragmentation and requires an extra collection cycle to relocate the data and make it available. This requires another e of extra space. Furthermore, the program traverses the heap in a piecemeal fashion which forces a maximum number of pointers to be pushed onto the work queue for each mark operation and requires N extra words of memory.

There are two things to note about the worst-case memory requirements of the preferred collector. First, the difference between the worst-case for the preferred collector and a copying collector is $e+N$ versus m. The space required to run a collection e is typically lower than the maximum live memory m and can be tuned. The maximum number of uncollected objects is the maximum uncollected space divided by the average object size in words A, or $(m+e)/A$. Since A is typically on the order of 8 for Java programs, N is typically small relative to m. Thus, for most programs, the worst-case performance of the preferred collector is smaller than that of a copying semi-space collector. Second, the likelihood of more than one of the worst case scenarios occurring concurrently is very low. In practice, this means that the amount of memory devoted to the system can be varied between the expected and worst-case space requirements depending on the acceptable failure rates for the system in question.

In accordance with the worst-case analysis of the collector, the program can be run in space $m+3e$ where m is the amount of maximum live data and e is the space required to run a single collection. However, executing within these boundary conditions will result in the collector always running. Even if the application utilization is 50% during a collection, this will lead to an overall slowdown of the program by a factor of two which may be unacceptable. The solution is to provide headroom so that the program can run for sometime before a collection must occur. For example, if enough headroom is provided so that the collector only runs 25% of the time, then the overall utilization rises to 87.5%. Preferably, the headroom is set to be e. A collection is thus triggered when the amount of memory in use is $m+e$.

Ideally, a precise timer is used to control the scheduling of the mutator and collector processes. However, if a precise timer is not available, an approximate method based on polling may be used. In such a system, the mutator polls the timer on the slow path of allocation when it moves to a new page or when the mutation buffer fills up. This keeps the polling out of the fast in-lined cases but is subject to some inaccuracy. However, as a practical matter, this is acceptable because the increase of mutator utilization is occurring at times when resource consumption is low. On the other hand, the collector performs work in progressively finer work quanta as it gets closer to the end of its time quantum. When the time is close to or exceeds the quantum, the mutator is resumed.

Figure 5:
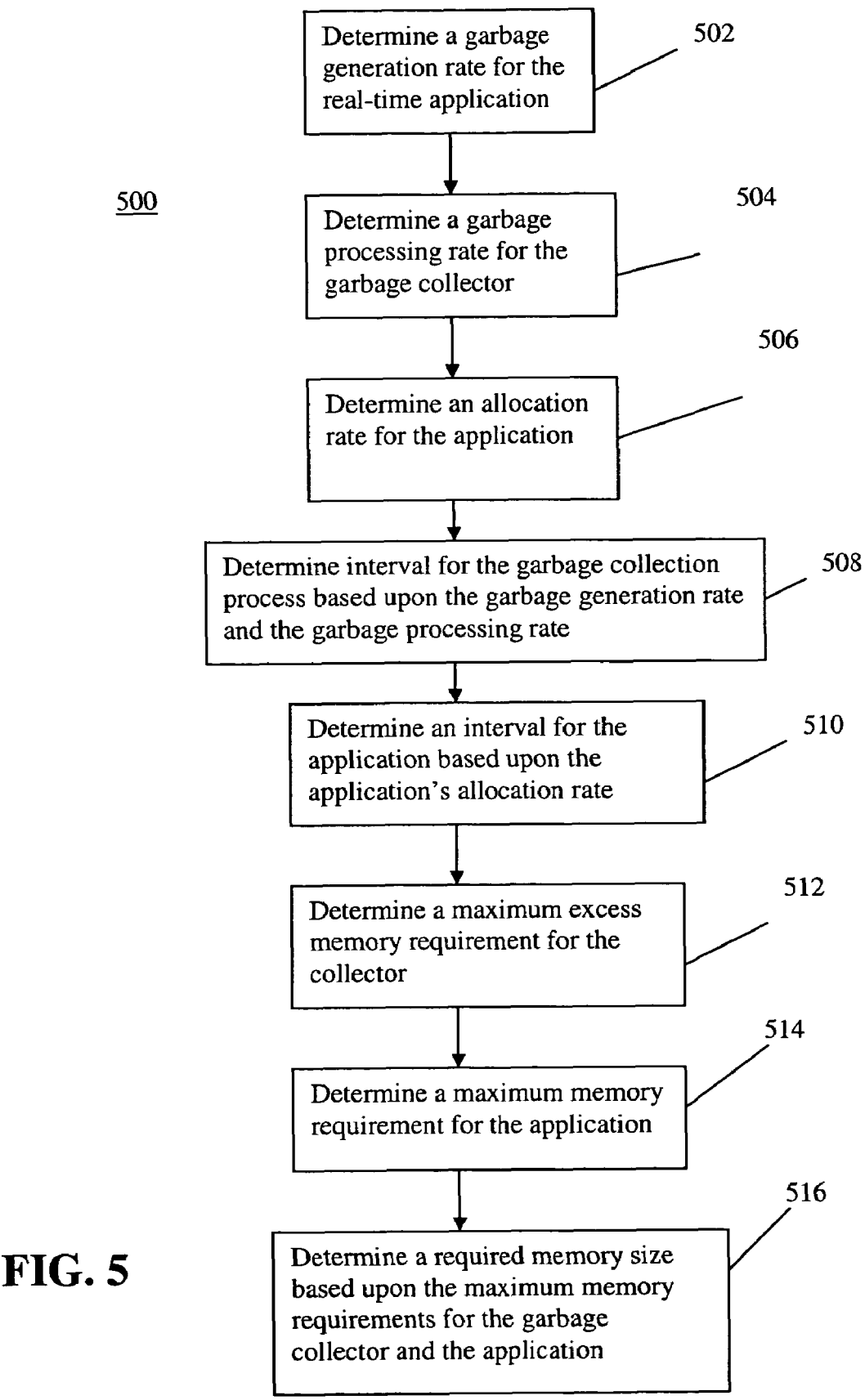
FIG. 5 is a flow chart of a preferred method for determining an appropriate time interval and amount of memory in accordance with the present invention.

A preferred method of scheduling a garbage collection in a real-time system is set forth in FIG. 5. The method commences in step 502 by determining a garbage generation rate for the real-time application. In addition, a garbage processing rate for the garbage collector is determined in step 504. The garbage generation and processing rates are used to describe the time-based performance of the garbage collector. An allocation rate for the application is determined in step 506. The allocation rate for the application is used to describe the time-based performance of the application. In step 508, an interval for the garbage collection process is determined based upon the garbage generation rate and the garbage processing rate. In a similar fashion, in step 510, an interval for the application is determined based upon the application's allocation rate. In order to select an appropriately sized memory, a maximum excess memory requirement for the collector is determined in step 512 and a maximum memory requirement for the application is determined in step 514. The memory requirements for the garbage collector and the application are then used to select a required memory size in step 516. Thus, the method shown in FIG. 3 allows a user to select an interleaving interval and a memory capacity for a system that will insure the application can satisfy its real-time requirements.

Figure 6:
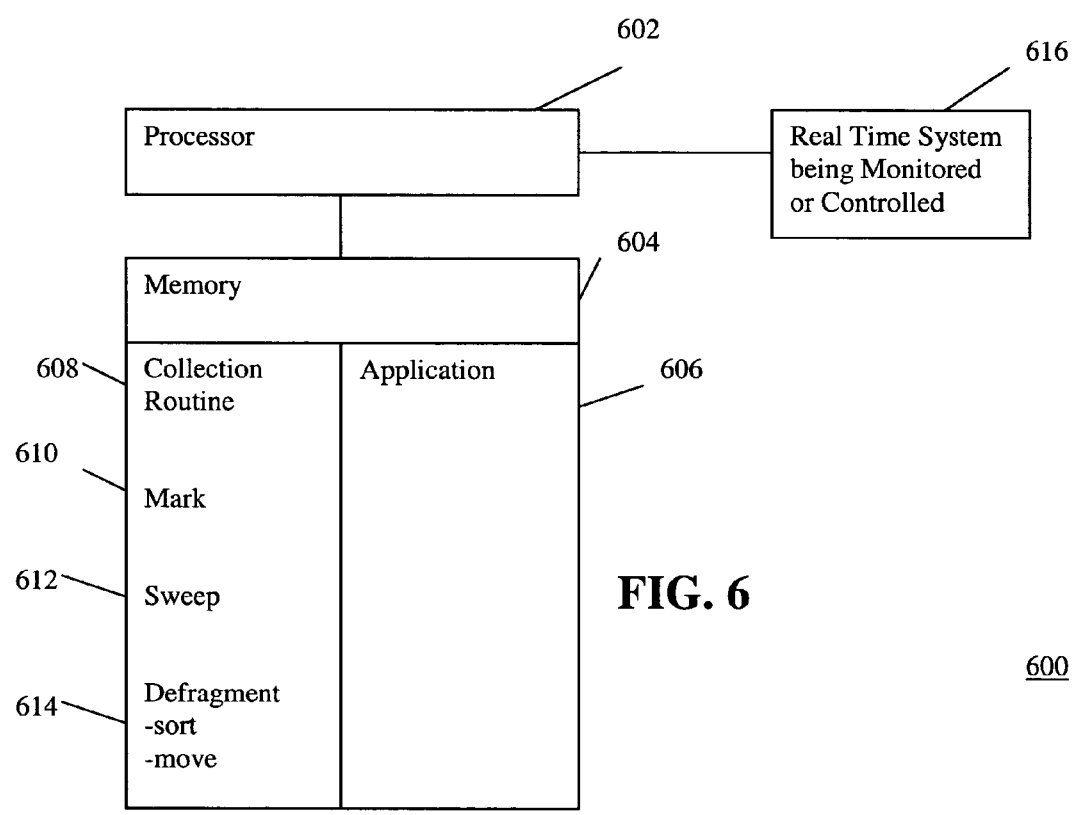
FIG. 6 is a diagram of an implementation of an embodiment of the present invention.

As shown in FIG. 6, a preferred embodiment 600 of the present invention can be implemented in software in a memory 604 that runs on a processor 602. The memory contains programming for an application 606 and a garbage collection process 608. A defragmentation routine 614 is inserted into a mark 610 and sweep 612 garbage collection routine 608 that functions as described in more detail above. The processor 602 interleaves the application 606 with the garbage collection process 608 having the mark 610, sweep 612 and defragmentation 614 routines on a time-based or work-based schedule. The garbage collection process 608 is bounded with respect to the time for collection and the overhead memory space required as described herein. Thus, the invention may be used to insure that an adequate amount of processor 602 capacity and memory is available to properly run the real-time system 616 being controlled or monitored by the processor 602 and application software 606.

Figure 7:
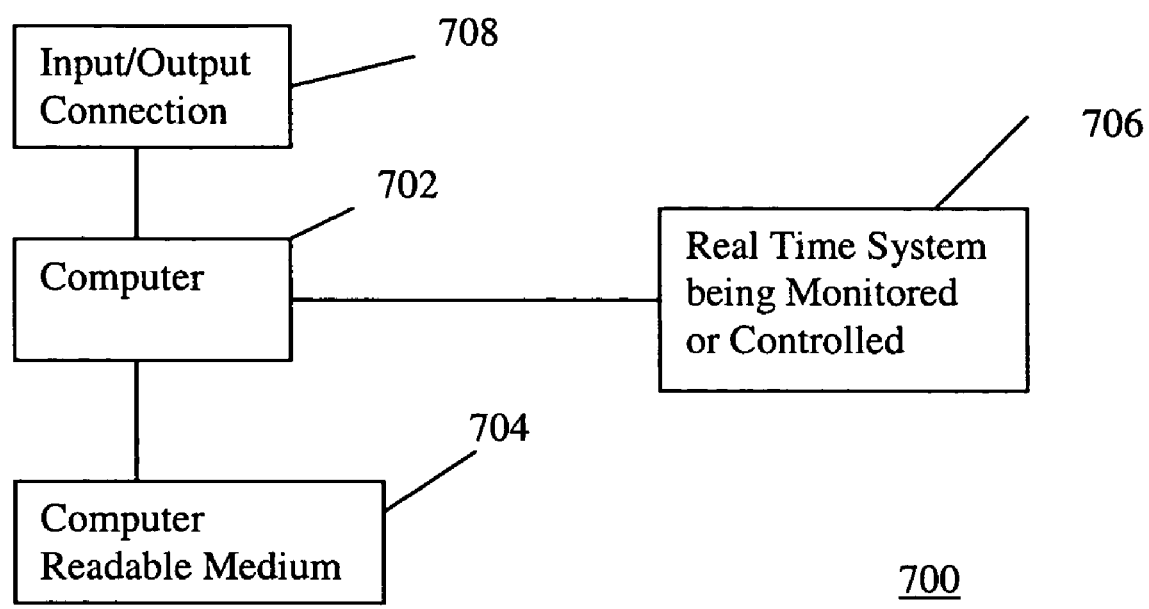
FIG. 7 is a diagram of an information processing system implementing an embodiment of the present invention.

Referring now to FIG. 7, a simplified diagram of an information processing system 700 for implementing an embodiment of the present invention is shown. The information processing system 700 is managed by a processor-based computer 702. The computer 702 receives instructions for implementing a garbage collection process and a real-time application from a computer readable medium 704 as described herein. The computer readable medium 704 could be a CD-ROM, memory or similar storage device depending upon the particular application. The computer 702 uses the instructions from the medium 704 to monitor or control a real-time system 706. The instructions include instructions for interleaving the garbage collection process and the real-time application on a time-based schedule or work-based schedule. The interval for the garbage collection process is selected based upon a garbage collection rate and a garbage generation rate. The interval for the application is selected based upon a maximum allocation rate of the application. The memory requirements for the computer are selected based upon a maximum excess memory requirement for the garbage collection process and a maximum memory requirement for the real-time application. A data input/output 708 allows the computer 702 to exchange information with remote devices.

What has been shown and discussed is a highly-simplified depiction of a programmable computer apparatus. Those skilled in the art will appreciate that other low-level components and connections are required in any practical application of a computer apparatus. Therefore, while there has been described what is presently considered to be the preferred embodiment, it will be understood by those skilled in the art that other modifications can be made within the spirit of the invention.

We claim:

1. A method of performing a mark and sweep garbage collection process for a real-time application such that it has determinable space bounds, the method comprising:
    using a memory for:
        allocating memory space for the application, wherein allocated memory is defined to include directly allocated memory and indirectly allocated memory due to mutation;
        segmenting the memory space into a number of pages of a predetermined size; and
        dividing the pages into blocks of a predetermined size;
    using a mutator for performing an iterative mutation process by:
        assuring that only non-null, unmarked objects are placed into a write buffer;
        identifying objects to be allocated;
        allocating the objects into the pages and blocks;
        marking objects no longer used as dead objects; and
        sorting the pages of memory according to a number of dead objects per page;
    wherein each iterative mutation process consumes memory a size of one object pointer;
    using a trace-based hybrid collector for:
        removing the dead objects; and
        defragmenting the memory space using defragmentation with limited copying of objects;
    using a processor for selecting an interval for an interleaving based upon a processing rate of the hybrid garbage collector; wherein the garbage collection process is bounded by a time for collection and an overhead memory space requirement; and
    using a timer for interleaving the garbage collection and the real-time application on a time-based schedule.

2. The method of claim 1 further comprising selecting an interval for the garbage collection proportionally based upon an amount of maximum live data.

3. The method of claim 1 further comprising
    selecting an interval for the real-time application based upon a memory allocation rate of the real-time application averaged over a time interval of the garbage collection.

4. The method of claim 1 wherein defragmenting the memory space is only performed when an amount of available memory space falls below a predetermined level.

5. The method of claim 1 further comprising
    determining a maximum excess memory requirement for the garbage collection and selecting an amount of memory space for the real-time application and the garbage collection process based upon the maximum excess memory requirement.

6. The method of claim 1 further comprising
    determining a maximum memory requirement for the application and selecting an amount of memory space for the real-time application and the garbage collection process based upon the maximum memory requirement for the application.

7. A computer-readable medium comprising
a program product for implementing a mark and sweep garbage collection process for a real-time application such that the real-time application can meet real-time requirements, the medium comprising instructions for:
using a memory for:
   allocating memory space for the real-time application;
   segmenting the memory space into a number of pages; and
   dividing the pages into blocks;
using a mutator for performing an iterative mutation process by:
   identifying objects to be allocated;
   allocating the objects into the pages and blocks;
   marking objects as no longer used as dead objects;
   sorting the pages of memory according to a number of dead objects per page;
wherein each mutation process consumes memory a size of one object pointer;
using a trace-based hybrid collector for:
removing the dead objects; and
defragmenting the memory space using defragmentation with limited copying of objects;
using a processor for selecting an interval for an interleaving based upon a processing rate of the hybrid garbage collector; wherein the garbage collection process is bounded by a time for collection and an overhead memory space requirement; and
using a timer for interleaving the real-time application and the garbage collection process on a time-based schedule.

8. The computer-readable medium of claim 7 further comprising instructions for only performing defragmenting of the memory space as part of the garbage collection process when an amount of free memory falls below a predetermined threshold level.

9. The computer-readable medium of claim 7 comprising instructions for interleaving the real-time application and the garbage collection process on a work-based schedule.

10. The computer-readable medium of claim 9 wherein a memory requirement for the real-time application and the garbage collection process is determined based upon an allocation quantum of the real-time application and an allocation quantum of the garbage collection process.

11. The computer-readable medium of claim 7 wherein a time interval for the garbage collection process is proportionally selected based upon an amount of maximum live data.

12. The computer-readable medium of claim 7 wherein a time interval for the real-time application is selected based upon a memory allocation rate of the real-time application averaged over the time interval of garbage collection.

13. The computer-readable medium of claim 7 wherein an amount of memory space for implementing the garbage collection process and the real-time application is selected based upon a maximum excess memory requirement of the garbage collection process.

14. The computer-readable medium of claim 7 wherein an amount of memory space for implementing the garbage collection process and the real-time application is selected based upon a maximum memory requirement of the real time application.

15. The computer-readable medium of claim 7 wherein the real-time application comprises a mutator and a mutator's write barrier that is responsible for making sure that only non-null, unmarked objects are placed into a write buffer.

16. A computer apparatus for performing a real-time application comprising:
a processor for executing instructions;
a memory for storing:
   application software for performing the real-time application; and
   a trace-based hybrid collector used to perform defragmentation with limited copying of objects, wherein mark and sweep garbage collection software comprises instructions for:
   segmenting a memory space into a number of pages of a predetermined size;
   dividing the pages into blocks of a predetermined size;
   identifying objects to be allocated;
   allocating the objects into the pages and blocks;
   marking objects as no longer used as dead objects;
   removing the dead objects;
   defragmenting the memory space;
   wherein the identifying, allocating, marking, and removing instructions are performed iteratively as part of an iterative mutation process and wherein each iteration consumes memory a size of one object pointer;
   selecting an interval for an interleaving based upon a processing rate of the hybrid garbage collector; wherein the garbage collection process is bounded by a time for collection and an overhead memory space requirement; and
   using a timer for interleaving the real-time application and the garbage collection process on a time-based schedule.

17. The computer apparatus of claim 16 wherein the processor comprises the memory for running the application software and the garbage collection software wherein a size of the memory space is selected based upon a maximum excess memory requirement of the garbage collection process.

18. The computer apparatus of claim 16 comprising a processor having a memory for running the application software and the garbage collection software wherein a size of the memory is selected based upon a maximum memory requirement of the real-time application.

19. The computer apparatus of claim 16 comprising time-scheduling software for interleaving the garbage collection process and the real-time application on a time-based schedule.

20. The computer apparatus of claim 19 wherein the interval for the garbage collection process is selected based upon an amount of maximum live data.

21. The computer apparatus of claim 19 wherein the interval for the real-time application is selected based upon a memory allocation rate of the real-time application averaged over the time interval of garbage collection.

* * * * *

UNITED STATES PATENT AND TRADEMARK OFFICE
CERTIFICATE OF CORRECTION

PATENT NO. : 7,624,137 B2
APPLICATION NO. : 10/751595
DATED : November 24, 2009
INVENTOR(S) : Bacon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-sixth Day of October, 2010

David J. Kappos
*Director of the United States Patent and Trademark Office*